Dec. 16, 1924.
F. E. LINDSLEY
HAYRACK
Filed May 24, 1921
1,519,852
2 Sheets-Sheet 1
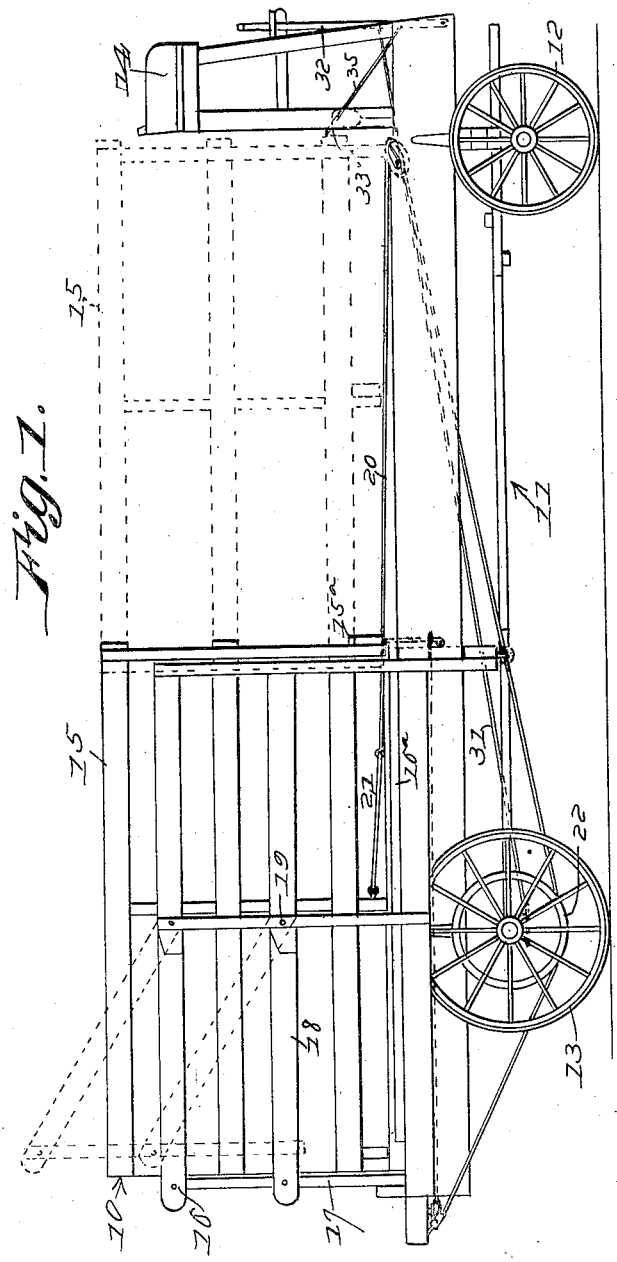
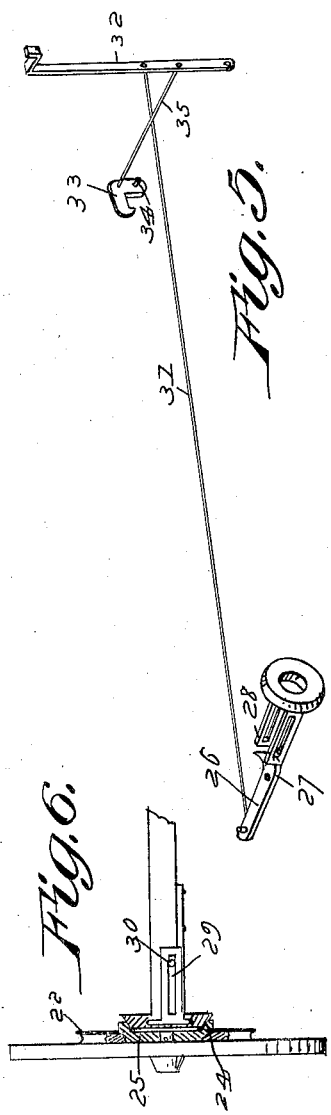
Inventor
Fred F. Lindsley
By
[Attorney signature]
Attorney

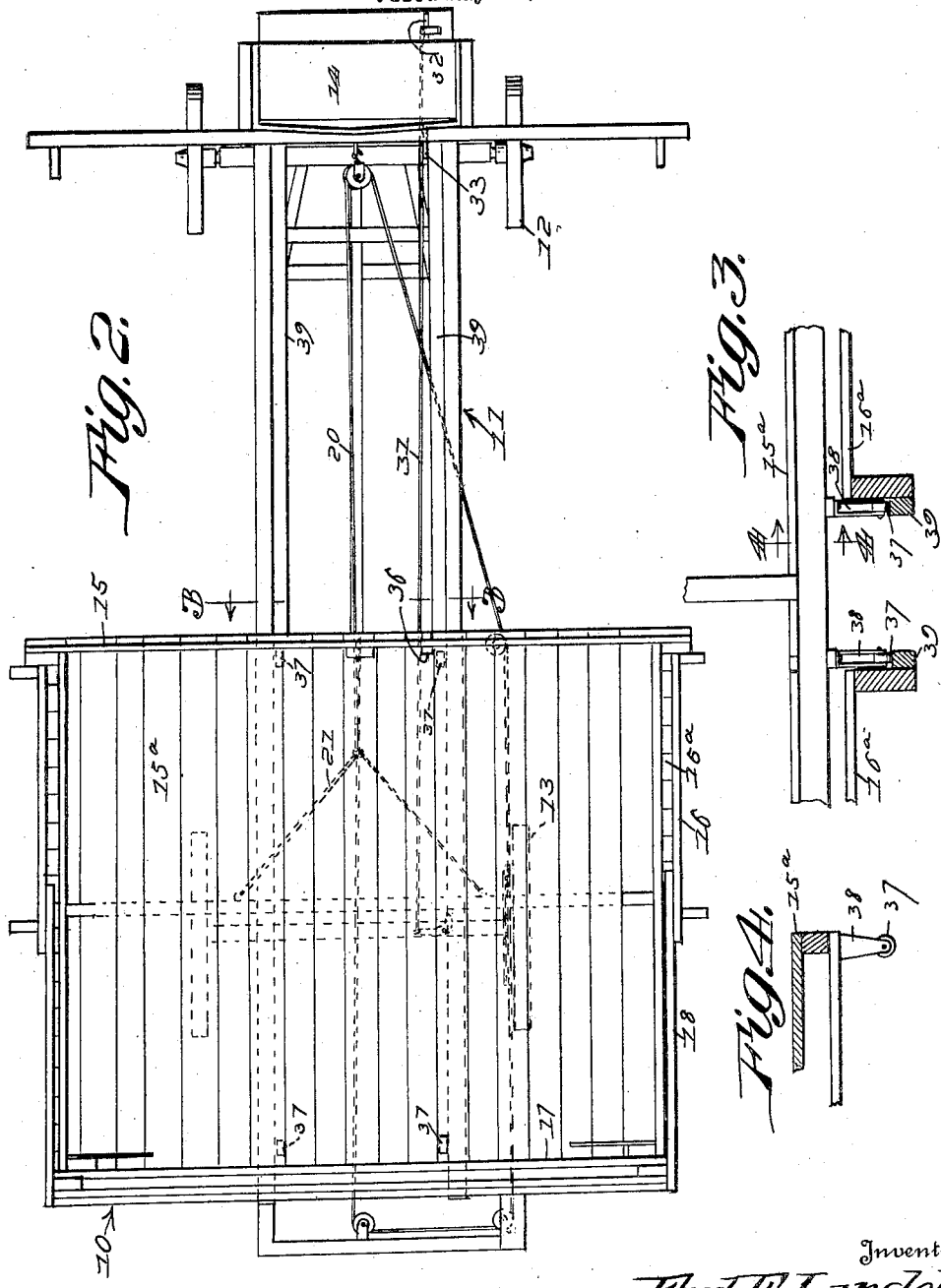

Patented Dec. 16, 1924.

1,519,852

UNITED STATES PATENT OFFICE.

FRED E. LINDSLEY, OF WASHINGTON, KANSAS.

HAYRACK.

Application filed May 24, 1921. Serial No. 472,065.

*To all whom it may concern:*

Be it known that FRED E. LINDSLEY, a citizen of the United States of America, residing at Washington, in the county of Washington and State of Kansas, has invented new and useful Improvements in Hayracks, of which the following is a specification.

The object of the invention is to provide an improved construction of wagon body more especially of the type conventionally referred to as a wheel rack for use upon a suitable truck or running gear to receive hay and like material as it is gathered in the field by a rake or similar harvesting apparatus, with the purpose of facilitating the loading of the body or rack without modifying the position of the harvesting or loading machine or the conveyor or discharge spout of such machine with relation to the length of the wagon body or rack which is receiving the load.

In the ordinary practice it is common to arrange the harvesting machine in such a way as to discharge into the wagon body or rack either at the center or at one end, and usually the rear end, particularly when the harvesting machine is of the rake type and is attached as a trailer to the wagon, and therefore the particular object of the invention is to provide a means whereby the load thus discharged by the rake or its equivalent into the wagon body or rack may be evenly distributed to insure the reception of a full load under conditions insuring the safe transportation thereof from the field to the barn or stack.

With these objects in view the invention consists in a construction and combination of parts of which a preferred embodiment is shown in the accompanying drawings, wherein:—

Figure 1 is a side view of a wagon having a body or rack constructed in accordance with the invention.

Figure 2 is a plan view of the same.

Figure 3 is a detail sectional view on the plane indicated by the line 3—3 of Figure 2.

Figure 4 is a section on the plane indicated by the line 4—4 of Figure 3.

Figure 5 is a detail view in perspective of the clutch and latch mechanisms and means for operating the same.

Figure 6 is a detail sectional view of the clutch by which one of the ground wheels is connected with the means for shifting the position of the movable body member or section.

The wagon body indicated generally at 10 in Figures 1 and 2 is carried by a suitable supporting frame or running gear 11 having the front and rear supporting wheels 12 and 13, and while the wheel supported frame or truck representing the running gear may be of any suitable or preferred construction with, for example a driver's seat 14 arranged at the front end thereof, the body or rack 10 is of sectional construction comprising the front and rear members 15 and 16 of which the former is shown in dotted lines in Figure 1 in its normal or extended position as when the vehicle is loaded and ready for movement from the field to the point of deposit of the load.

One of the sections or members of the body or rack is movable relative to the other or is collapsible with relation to the other to occupy a position substantially coextensive therewith, and preferably as shown in the drawing the front member 15 is movable with relation to the rear member to occupy the position indicated in full lines in Figure 1 and also in Figure 2 so that a trailing hay rake (not shown) depositing material in the normal way into what ordinarily would be the rear end of the wagon body or rack is actually depositing material into the front end of the wagon body or rack. After this shiftable front member of the rack has been filled it may then be removed to its normal position as indicated in dotted lines in Figure 1 and the continuance of the deposit from the hay rake will then fill the rear end of the wagon body or rack so that a complete load is received by the wagon to avoid the necessity of arrangement of the material in the body by an attendant on the load.

In the illustrated embodiment of the apparatus the floor $15^a$ of the movable or forward member or section of the wagon body or rack is disposed in a plane adapting it to pass over the floor $16^a$ of the rear member or section of the body or rack and the rear end of the rear member or section is formed by a vertically movable gate 17 carried by side arms 18 which are pivoted as at 19 for upward swinging movement as shown in dotted lines in Figure 1 for adjustment of the gate to the height of the floor of either rack section or member.

The movement of the forward member or section of the body or rack from its collapsed to its extended or normal position or in other words from the full line position indicated in Figure 1 to the dotted line position in the same figure, is effected by means of a cable or belt 20 of endless construction connected by the divergent branch elements 21 with the front member or section, the belt extending around the axle carried pulley 22 which is mounted in co-axial relation with one of the rear ground wheels 13 and is adapted to be clutched with said ground wheel when its cavitied member 25 is engaged by a conical axially movable member 24. The latter is mounted for sliding movement on the axle supporting the ground wheel and is provided with side arms 28 which are longitudinally slotted for engagement with guide pins carried by the axle, the arms being disposed on opposite sides of the axle. Thus movement of the member 24 toward and away from the member 25 will serve to force the latter either into engagement with the wheel hub or to release it from such engagement. It is not necessary to provide means for moving the member 24 away from the member 25 but when necessary to provide means for keeping the two in engagement and to keep the member 25 in contact with the hub such means comprises a lever 26 formed with a terminal cam 27 for engagement with the extremities of the arms 28, the lever being pivotally mounted on the under face of the axle and actuable through a foot lever 32 with which it is connected by means of a rod 31. Obviously forward movement imparted to the foot lever will rock the lever 26 in a direction to effect the camming action of its extremities against the arm 28 and thus force the member 24 into engagement with the member 25 and effect the clutching of the pulley 22 with the ground wheel 13. If the lever 32 is moved rearwardly, as it will do normally when the foot is removed therefrom, the rod 31 will oscillate the lever 26 to disengage the terminal cam from the arms 28 and thus remove the force tending to engage the members 24 and 25 and the pulley 22 will thereby be released from engagement with the ground wheel 13.

A latch 33 is pivoted, as at 34, to the frame or running gear of the truck at or near its front end and is connected by a wire or chain 35 with the operating lever 32 and is provided with a nose for engagement with the forward end of the movable rack section 15 in the normal position of the latter. Thus the latch serves not only to hold the forward section in its normal position but holds the operating lever 32 rearwardly disposed to preclude engagement of the clutch elements and the clutching of the pulley 22 with the drive wheel.

The movement of the front member or section of the body or rack upon the frame is facilitated by the bearing rollers 37 mounted upon arms 38 depending from the floor of the rack member 15 and operating upon track bars 39.

Having described the invention, what is claimed as new and useful is:—

A vehicle having a sectional body comprising front and rear members of which the former is movable into collapsed relation with the latter, clutch controlled actuating means operatively engaged with the ground wheel for moving the front member from its collapsed position to its normal position in front of the rear member, an operating lever operatively connected with said clutch controlled means, a latch pivot on the frame of the vehicle and having a nose for engagement with the front member in the normal position of the latter, and a flexible connection between said latch and said operating lever whereby, when the latch is engaged with the front section, the operating lever is held in retracted position to retain said clutch controlled means inoperative.

In testimony whereof he affixes his signature.

FRED E. LINDSLEY.